United States Patent
Deac

(10) Patent No.: US 11,088,983 B2
(45) Date of Patent: Aug. 10, 2021

(54) MESSAGING SYSTEM WITH PREFABRICATED ICONS AND METHODS OF USE

(71) Applicant: Titus Deac, Vancouver (CA)

(72) Inventor: Titus Deac, Vancouver (CA)

(*) Notice: Subject to any disclaimer, the term of this patent is extended or adjusted under 35 U.S.C. 154(b) by 99 days.

(21) Appl. No.: 16/232,819

(22) Filed: Dec. 26, 2018

(65) Prior Publication Data

US 2019/0207903 A1    Jul. 4, 2019

Related U.S. Application Data

(60) Provisional application No. 62/708,908, filed on Dec. 29, 2017.

(51) Int. Cl.
*H04L 12/58* (2006.01)
*H04L 29/08* (2006.01)
*H04L 12/18* (2006.01)

(52) U.S. Cl.
CPC .......... *H04L 51/32* (2013.01); *H04L 12/18* (2013.01); *H04L 67/303* (2013.01); *H04L 51/02* (2013.01); *H04L 51/08* (2013.01); *H04L 67/10* (2013.01)

(58) Field of Classification Search
None
See application file for complete search history.

(56) References Cited

U.S. PATENT DOCUMENTS

| | | | |
|---|---|---|---|
| 8,892,679 B1 | 10/2014 | Byttow et al. | |
| 8,918,339 B2 | 12/2014 | Rubinstein et al. | |
| 9,087,320 B2 | 7/2015 | Goldman et al. | |
| 9,720,585 B2 | 8/2017 | Fadell et al. | |
| 2003/0154446 A1* | 8/2003 | Constant | H04L 51/38 715/256 |
| 2007/0208751 A1* | 9/2007 | Cowan | G06Q 10/10 |
| 2010/0179991 A1* | 7/2010 | Lorch | H04L 51/063 709/206 |
| 2013/0259216 A1 | 10/2013 | Adzhamyan | |
| 2013/0275525 A1* | 10/2013 | Molina | H04L 51/12 709/206 |
| 2015/0268818 A1 | 9/2015 | Zewail | |
| 2016/0035123 A1* | 2/2016 | Bonansea | H04L 51/10 345/473 |
| 2017/0220578 A1 | 8/2017 | Kazi et al. | |
| 2018/0255009 A1 | 9/2018 | Chen et al. | |

FOREIGN PATENT DOCUMENTS

EP    0647057        4/1995
WO    186325 A1    11/2016

* cited by examiner

*Primary Examiner* — Kevin T Bates
*Assistant Examiner* — Emad Siddiqi

(57) ABSTRACT

A social media message system is described allowing open access to all users. The message system utilizes one or more libraries with prefabricated icons for sending messages of a generally positive nature. The messaging system may use words in the icons, but otherwise does not allow users to generate alpha numeric text messages or emoticons.

12 Claims, 11 Drawing Sheets

MESSAGING SYSTEM WITH PREFABRICATED ICONS AND METHODS OF USE

RELATED APPLICATION

This application claims the benefit of U.S. Provisional Application 62/708,908, filed 29 Dec. 2017, entitled "Billion Club—global network of athletes and sports fans," which is incorporated by reference in its entirety.

FIELD

This disclosure generally relates to electronic messaging systems and methods, using prefabricated icons.

BACKGROUND

Social media platforms use electronic messaging as a way for members of the social media platforms to stay in touch. Members (users) may send text messages to one another, post messages onto forums and go back and forth between email services with text messages.

The use of electronic messaging is ubiquitous in modern society. Most adults with a cell phone, tablet or other portable wireless device, are able to keep tabs on their "friends" or other contacts in social media at any time. The pervasive use of electronic messaging has produced many benefits and a few problems.

Some popular text messaging and social media platforms today include Facebook and LinkedIn. These platforms require new users to log in and create a user account. The user account may be screened by the administrator and persons may be denied accounts, or admitted to use the social medial platforms. However once a person has an account, they may only communicate with people who either have the same privacy settings (e.g. all public so any user may see anything another user posts), or with people who they request to communicate with, and accept (they become "friends" on the social media platform). After a person becomes friends, or is admitted into a circle of a user, that person may communicate with the user using text messages, emails, or posts on their home page. Generally messages are friendly or informative and most users do not abuse these platforms for malicious communication. However malicious communication does occur, and it's created a new problem often referred to as "cyber bullying."

Electronic messaging primarily is made up of text messages. These messages may be augmented with icons such as Emoji's. Individual users may customize their messages by using any combination of texts, Emoji's, photographs and videos (either in the form of pictures taken from their handsets, or shared links to internet based material) or other information they may send through the messaging format, such as sharing contacts, calendars, email addresses, etc. An example of an electronic messaging system used particularly for sports enthusiasts is U.S. Pat. No. 9,087,320 describing a system and method where subscribers to the system may coordinate with each other various sports related activities. The messaging system is primarily designed to help local persons coordinate activities of parents, athletes, coaches and logistic elements for games and practices.

The use of Emoji's as icons is particularly useful. Emoji's may reflect a wide range of emotions from love to hate, fear and loathing to joy and happiness. Examples of emoji usage include U.S. Pat. No. 8,918,339 describing a method for users to view a library of Emoji's and purchase them for use with their messaging program. US 2018/0255009 describes a method for detecting the occurrence of an Emoji usage by a user, so as to provide a recommendation to the user of additional Emoji's that may be desired for the user to use in their messages. Emoji's tend to be small and simplistic in design, thus they have a limited range of expression for each Emoji.

One of the issues facing social media today is cyber bullying. The lack of physical interaction between users in social media has emboldened many users to say or message material that they would not use in the course of actual face-to-face conversations. The ability to be anonymous allows an individual to post messages without fear of being personally identified. The anonymous nature may embolden individuals to engage in cyber bullying since they do not fear any consequence of their actions, such as identification, reprisal, or counter attack. Cyber bullying is a major problem in social media, and many platforms are adopting policies and developing programs to stop or curtail cyber bullying after such events are reported to the services. An example of a developing technology to promote positive messaging is US 2015/0268818 which provides a method to provide positive feed back to users via a voting or popularity system, and encourages users to use more positive elements and less negative elements. The system does not prohibit the use of negative messages.

Unfortunately these practices respond to a problem after the issue has already been seen by a recipient. It is the nature of reporting an issue that the one doing the reporting has already been the victim of the bullying. Bullying may be mean statements, harassing or embarrassing videos/pictures, threats or any message intended to intimidate, produce fear or make a recipient feel bad. Solutions which encourage positive feedback but do not remove negative feedback do not solve the cyber bullying issue.

Thus there remains a need for an electronic messaging system that may accept users and allow messaging without cyber bullying.

There also remains a need for a messaging service that may be used to foster positive feedback for its members, and not rely on detailed and invasive filters in an attempt to weed out people who may have negative intent.

BRIEF SUMMARY

These and other objectives may be achieved through the implementation and use of an electronic messaging system using a library of prefabricated icons. The use of this system and method promote a more positive form of electronic communication. The system and method restrict communication to a set of prefabricated icons that may only be altered by an administrator, thus there is no capability of a user to create text messages, and this should reduce the incidence of cyber bullying.

The computer-implemented method for communicating a message over a network using a secure messaging protocol between two or more computing devices in the network involves storing one or more prefabricated icons in a message support library of an electronic message system, each prefabricated icon providing at least one of a celebratory, positive or festive message. Presenting to a member computing device at least one prefabricated icon configured for placement into the message for communication over the electronic messaging system. Selecting at the member computing device of one or more prefabricated messages for insertion into a message field of the message, the message field being associated with a header field to complete an electronic message. Receiving at a network computing device of the electronic message system the message selected at and transmitted by the member computing device and broadcasting a transmitted message to the member computing devices subscribing to membership in a communication group service associated with the member computing device sending the message. The message field includes no content other than the one or more prefabricated icons.

There is also a system for communicating a message over a network using a secure messaging protocol between a plurality of computing devices in the network, the system having a network computing device comprising a member registration platform, the member registration platform configured for enabling a plurality of member computing devices to register to be in a communication group with other member computing devices that have registered to be a part of the communication group. A member services library, the member services library configured to store one or more of a services application that are available to computing devices of the communication group. A membership register, the membership register configured to store data on each computing device within the communication group. A message support definition library, the message support library configured to store a message permitted for communication over the system. A communication platform configured for connecting a plurality of member computing devices, the connection of the plurality of member computing devices enabling real time communication between member computing devices subscribing to the communication group. The network computing device is configured to receive the message from a member computing device that has registered to be a part of the communication group. The message received from the member computing device that has registered to be part of the communication group have a header field and a message field, and the system is configured to enable the message field to include no content other than one or more of a prefabricated icons.

These and other features and advantages of this description will become more readily apparent from the following Detailed Description, which proceeds with reference to the drawings, in which:

In an embodiment of the present invention, it is provided that a global network of athletes and sport fans, like the Billion Club, could be created by enrolling in the Club the worldwide athletes competing at local and other levels, as well as the members of these athletes' inner circles of family and friends, with whom they interact online frequently ("proximal fans") and, further, the athletes and sport fans included in these members' own inner circles of family and friends, a.s.o., or even "distant" fans sharing common interests ("fans chain").

In an embodiment of the present invention, it is also provided that a global network of athletes and sport fans, could be developed and maintained by providing its members with (a) a system of standard and/or customizable and personalized communication tools, programs and platforms containing illustrations, photos, other images and short expressions, and combinations thereof, capable of being delivered periodically, including daily, to members, as well as (b) a global system of memorabilia Exchanges, and (c) certain inducements and privileges.

DETAILED DESCRIPTION

In the various embodiment described herein, elements that are the same are identified with the same part number. Elements that are similar may be identified with a different part number even if they may perform a similar function. In the various embodiments, a subscript letter is used to describe one or more instances of an element, feature or step. The subscript "n" signifies there may be any number of that element, feature or step.

Described herein are a variety of prefabricated icons. In the various embodiments, messages of the present system may use images and words in prefabricated icons. The word or words may represent generally positive, cheerful ("Cheer"), celebratory and happy feelings and intent. As described herein, the "word" element of an icon, or an icon of a word, refers to a prefabricated assembly of alpha-numeric symbols that form a word. In some embodiments where the language is not suited to alpha-numeric symbols (like Chinese), the prefabricate word icon may represent a word character of the appropriate language (e.g. 爱, meaning "love"). As with all the prefabricated icons of the present disclosure, the word icons do not represent editable content that a user may modify. Reference herein to a user(s) or member(s) are to be treated as equivalent or interchangeable. Users are distinguished from administrators, who maintain and service the messaging system.

Figure 1:
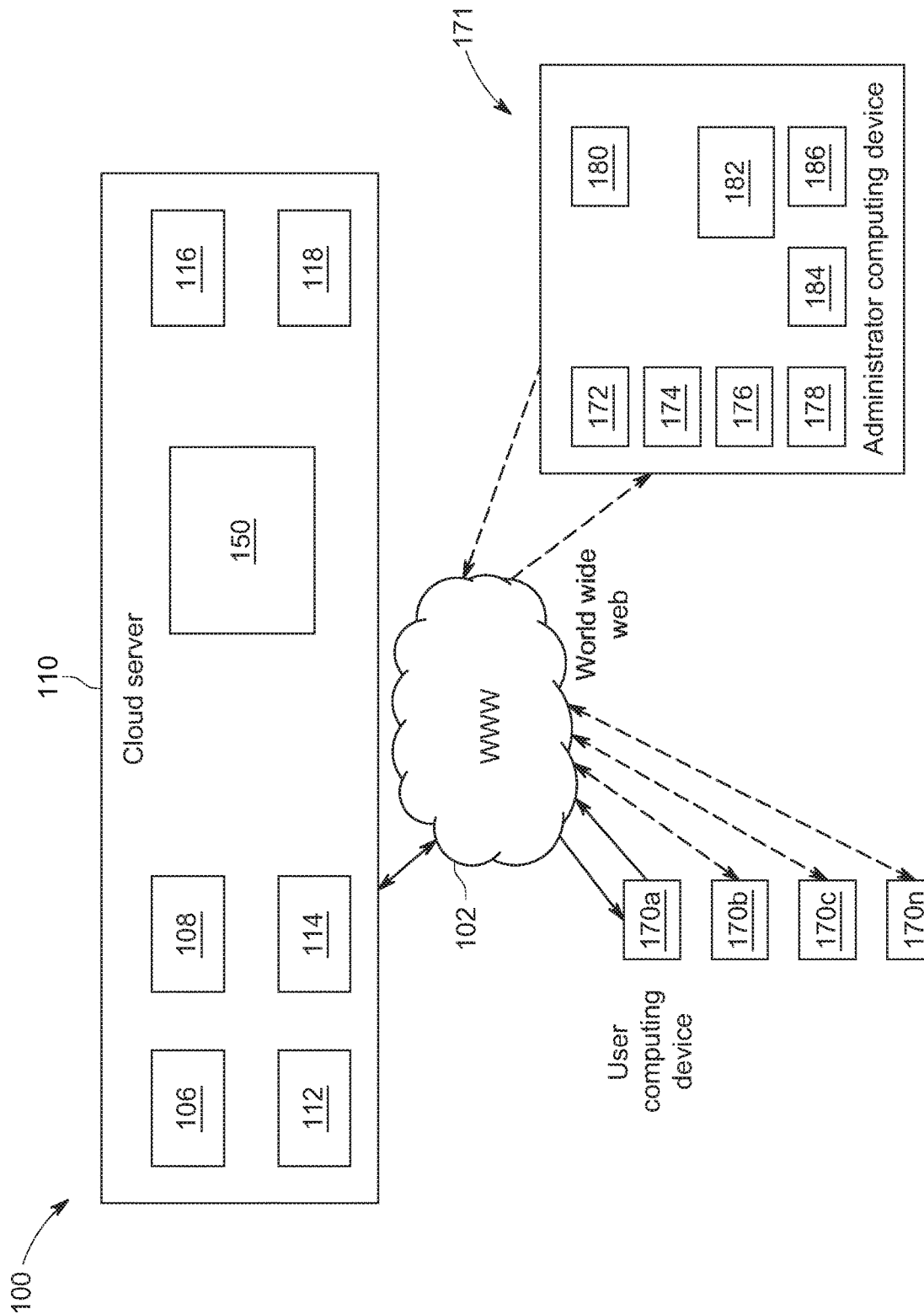
FIG. 1 illustrates a sample system architecture according to an embodiment.

A sample system architecture 100 is shown in FIG. 1. The system may have a cloud server 110 connecting one or more user devices $170_{a-n}$ through a web portal, 102. An administrator device 171 is also shown. While an administrator device 171 is shown, it will be appreciated that the functions performed by the administrator device 171 may be functions performed by the cloud server 110.

The cloud server 110 may have a member services platform 106, a registration platform 112, a member list 108 and a real time peer to peer connect 114 of all members. The cloud server 110 may also have a message support definition library 150, and administrator editor interface 116, and a device management library 118.

The real time peer-to-peer connect 114 may communicate to or through the cloud/web 102, an administrator device 171, and reach one or more individual member devices $170_{a-n}$.

Each administrator device 171 and member device $170_{a-n}$, may have a processor 172, a memory 174, a wired or wireless communication module 176, a user interface 178, an output device 180. Each device 171, 170$_{a-n}$ may also have a deployment manager 184 and a message support definition generator 186. The message support definition editor module 182 is not part of the user devices 170$_{a-n}$.

The processor 172 may be implemented in any number of ways. Such ways include, by way of example and not of limitation, digital and/or analog processors such as microprocessors and digital-signal processors (DSPs); controllers such as microcontrollers; software running in a machine; programmable circuits such as Field Programmable Gate Arrays (FPGAs), Field Programmable Analog Arrays (FPAAs), Programable Logic Devices (PLDs), Application Specific Integrated Circuits (ASICs), any combination of one or more of these, and so on.

The memory 174 are computer readable storage media that may be encoded with computer executable instructions (e.g. software) that implement or enable the system. Memory may be any form of data storage. It may be at least one random access memory (RAM), and/or read only memory (ROM). Information may be stored permanently until over written and/or stored temporarily for use while the unit is active. One or more storage devices (not shown) may also be used to store information in the illustrative computer system. The storage devices may illustratively include disk drives or other non-volatile storage media.

The communication module 176 is hardware and software configured to provide for communicating with other devices. Such communication may be performed wirelessly, or via wire, or by infrared communication, and so on. In this way, data structures and message structures may be transmitted via a data transmission medium, such as a signal on a communication link from the cloud server 110 to user devices 170 (and visa versa) on the network.

In an illustrative embodiment, the communication module may comprise a wireless module for establishing a wireless communication link with a network. The wireless module may illustratively be a Wi-Fi module. Alternatively, the wireless module maybe be a Bluetooth module, a CDMA module or any other communication module that enables a wireless communication link for the bidirectional flow of data between devices wirelessly. In alternative embodiments, the communication module establishes a wired communication link with a network via a USB connector, and RS232 connector, or other hardware connectors well known in the art.

The communication module may use various communication links, such as the internet, a local area network, a wide area network, a point-to-point dial-up connection, a cell phone network, and so on.

The user interface 178 may be implemented in any number of ways. For example, interface 178 may include a screen to display data. Interface 178 may also include a microphone and/or speaker (not shown), to issue voice prompts, play back audio media, etc. Interface 178 may be a touch screen keypad that is rendered on the display and which allows a user to enter data or to read data that is rendered on the display. Interface 178 may additionally include various controls, such as push buttons, keyboards, and so on. The interface 178 may be a single integrated device such as the touch screen of a mobile phone, or it may involve many devices such as those often associated with a desktop computer (one or more of: keyboards, monitors, mouse/tablet, speaker, microphone, etc.).

The output device 180 may be output devices such as a visual display capable of displaying data. Displays for use with this disclosure may include a LED/LCD/OLED screen, an e-paper display, or other bi-stable display, a CRT display, a touch screen responsive display, or any other type of visual display. The display may be integrated into computing device 170 or it may be external to and in communication with computing device 170. Illustrative external devices may be a computer selected from the group consisting of a server, a personal computer, a tablet, a mobile computing device, a video device, a console gaming device, a set-top TV device, a internet connected automobile device, and so on.

The computing device may be implemented in various operating environments that include personal computers, server computers, hand held and laptop devices, multiprocessor-based systems, programmable consumer electronics, networks PCs, microcomputers, mainframe computers, distributed computing environments that include any of the above systems or devices and so on. The computing device may be cell phones, personal digital assistants, smart phones, personal computers, programmable consumer electronics, and so on.

Device 171 of the administrator also includes a message support definition editor module 182 that includes an application that runs on a personal computer (PC), tablet computer, or mobile computing platform that allows an administrator to select, edit and implement message support tools across a distributed set of user devices 170. This application may be native to the operating system it is running on, or implemented through a .net/HTML5 implementation. Illustratively, the editor is a native application running on a Windows or iOS platform. The functionality and operation of the Editor 182 is described in greater detail herein.

The message support definitions library 150 comprises a database of prefabricated icons to be used in messaging between the computers and computer systems of this disclosure. The prefabricated icons may be arranged by topics, such as for particular sports, or by messages in an alphanumeric order, or related to particular events (such as for Mother's Day).

The device management library 118 is an application that along with service support tools (not shown) determines and manages what possible outputs may be created. For example, the device management library and supporting tools set maintain the latest device and software sets for all consumer owned devices. The device manager library and support tools may work alone or in conjunction to maintain consistent configuration across all customer owned devices. In addition, the device management library may also have the ability to determine how often the message support definitions are used and what specific user inputs have been captured from each use.

The device management library manages downloads of data and applications to the user devices 170. Software downloads may be delivered to customers devices virtually through the web 102, which may be a cloud based communication system. Alternatively, the downloads may be delivered manually through service support tools.

The network 102 illustratively comprises a wide area network such as the internet, however the network 102 may also comprise local area networks. Further, the network 102 may not be a land based network, but instead may comprise a wireless network and/or a hybrid of a land-based network and a wireless network for enhanced communication flexibility.

The one or more user devices 170$_{a-n}$ is illustrative of one or more computers, tablets, smart phones and other devices for accessing social media.

The registration platform 112 serves as an open gateway for any user to access the messaging system described herein. The registration platform may take down sufficient information to identify a user to the system, so the system may track and identify the user's commands, message output and messages received. A user may create an account, and provide information to the system so the user's interests may be identified and correlated with other users with similar interests. The registration platform may also allow users to identify specific friends or known associates in order to form a message group of those individuals.

Once a user is registered, the information about the user may go to a members database 108. The member database allows the system to correlate users and specific interests, such as sports fans, event fans, or people sharing a particular individual in a group they wish to communicate with regularly in a positive fashion. The members database may parse data, search, sort and report the data contents to an administrator. The system may sort and search the data to find matches of a user request to other users matching the particular request.

The member database 108 may contain information about individual users that acts as a screen to what kind of messages may be appropriate for a particular user to receive. In an embodiment, a user may be an athlete that participates in a gender specific field, such as men's or women's gymnastics, ladies figure skating, and so on. A user with a specific athletic profile may provide that data to the member database 108. The system may use that data to ensure the recipient receives messages from the community that are appropriate to that person. In one non-limiting example, it could ensure that an athlete that participates in women's gymnastics does not receive messages related to the men's field, or from other sports. In some embodiments, there may be limitations based on athletic activities that are winter sports, or summer sports, indoor sports or outdoor sports. These user inputs may assist the message system in providing only relevant, and positive messages to each user.

A member services platform 106 may contain a library of applications (apps), programs and/or tools for use on a user device in conjunction with the system. The member services platform may contain apps that may operate on a wider variety of user devices. The members service platform 106 may coordinate with the device management library 118 to determine for each user if the system may support the user's device. If the proper app for the corresponding device and operating system is within the parameters of supported devices, the system may upload the appropriate apps to the user device. Alternatively, the app may be web based or cloud based, with a web interface the user may reach using a web browser. In this embodiment the member services platform may be accessed by users with active internet connections. While a client side app may allow a user to draft and store messages while offline, and send them later when the user device regains internet connectivity.

The real time peer-to-peer connect 114 for message system members may connect users online to the cloud server. Users may use their local device apps or use the browser based service to connect from their device to the client server, select prefabricated icons from the message library, and send those messages to other users. The messages are limited to the library of prefabricated icons, and no texting or creating user original messages separate from the prefabricated icons is permitted by the system. The messages selected by the user follow the guidelines of the message support definition generator 186. Sending of messages may be handled by the deployment manager 184.

Figure 2:
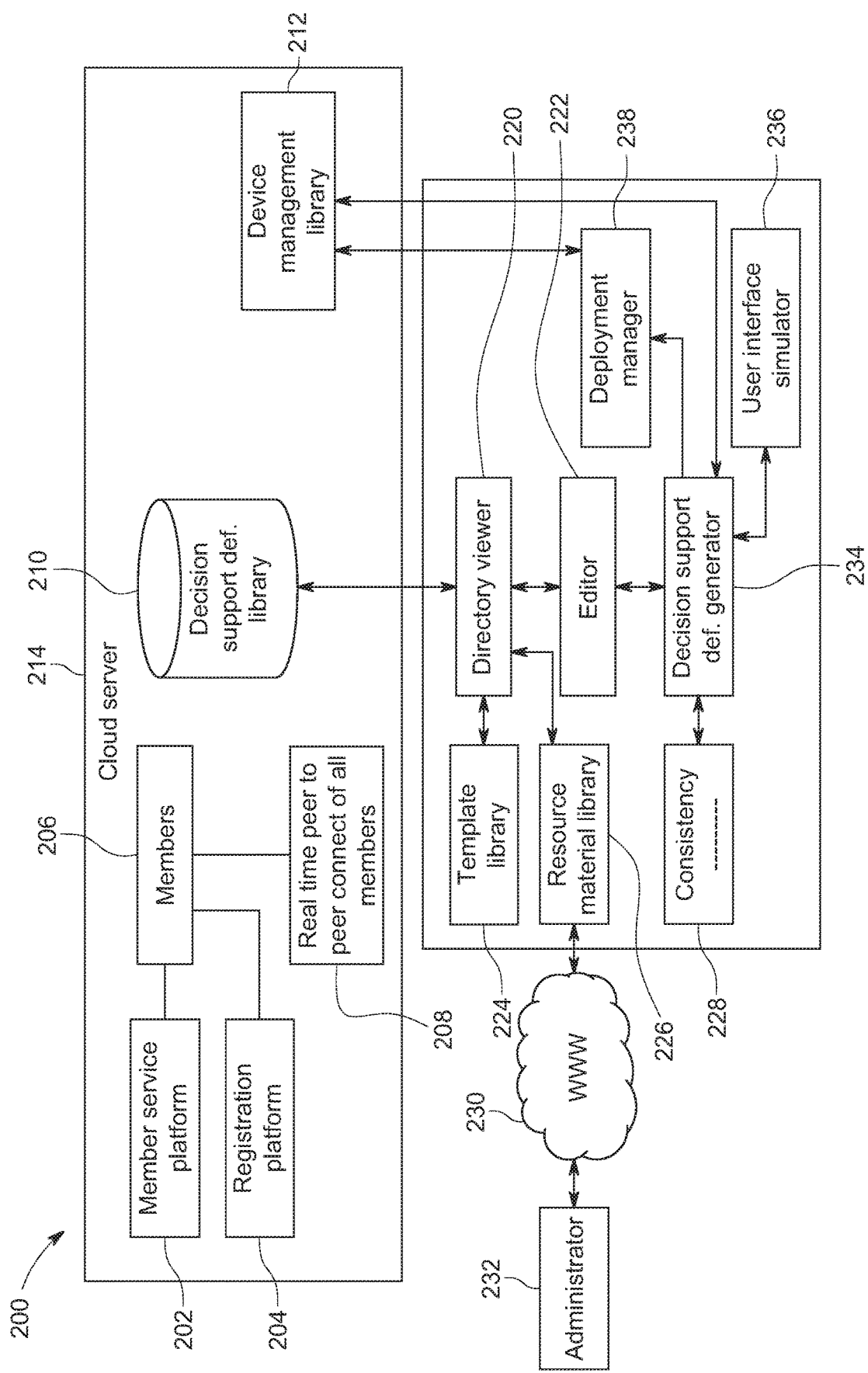
FIG. 2 illustrates an administrator editor according to an embodiment.

FIG. 2 illustrates a message support definition editor module 182 shown in FIG. 1 for creation and distribution of messages by an administrator according to this disclosure. The message support definition editor module 218 comprises a message support definition editor 222, a directory viewer 220, a message support definition generator 234, and a deployment manager 238. The message support definition editor module further includes a template library 224, a resource material library 226, a consistency checker 228, and a user interface simulator 236.

The editor 222 is the application included in the decision support definition editor module 218 that runs on an administrator user device, such as a personal computer, tablet or smart phone. The editor allows an administrator to select, edit and implement decision support tools across a distributed set of user devices. As previously explained, this application may be native to the operating system it is running on, or implemented through a .net/HTML5 implementation. Illustratively, the editor is a native application running on a Windows or iOS platform. The functionality and operation of the editor 222 is described in greater detail later.

The message support definition generator 234 is an application that creates the message support definition sets that are loaded onto the users computer devices. In other words, the message support definition generator 234 generates the intelligent agents that are loaded into each of the selected user computer devices. This download is managed through the device manager library and supporting tool sets as previously explained that maintain the latest device configuration and software sets for all customer devices. As previously explained, software downloads may be delivered to customer's computer devices virtually through network 230, which may be a cloud based communication system. Alternatively, the downloads may be delivered manually though the service support tools.

The deployment manager 238 is an application that loads the message support definition sets into each of the allocated user computer devices. The deployment manager acquires appropriate approvals required before deployment and works in conjunction with the device management library and supporting tool sets to authorize and track implementation on allocated users computer devices. As previously explained, the device management library has the ability to determine how often the message support definitions are used and what specific user inputs have been captured from each use. The deployment manager may use this data to provide usage metrics to the administrator on the various message support definitions that exist within the system and user devices.

The template library 224 is a library of components that provide a ready-set of common algorithms, containers, functional and iterators that may be used with the computer system 200 according to this disclosure.

Figure 3:
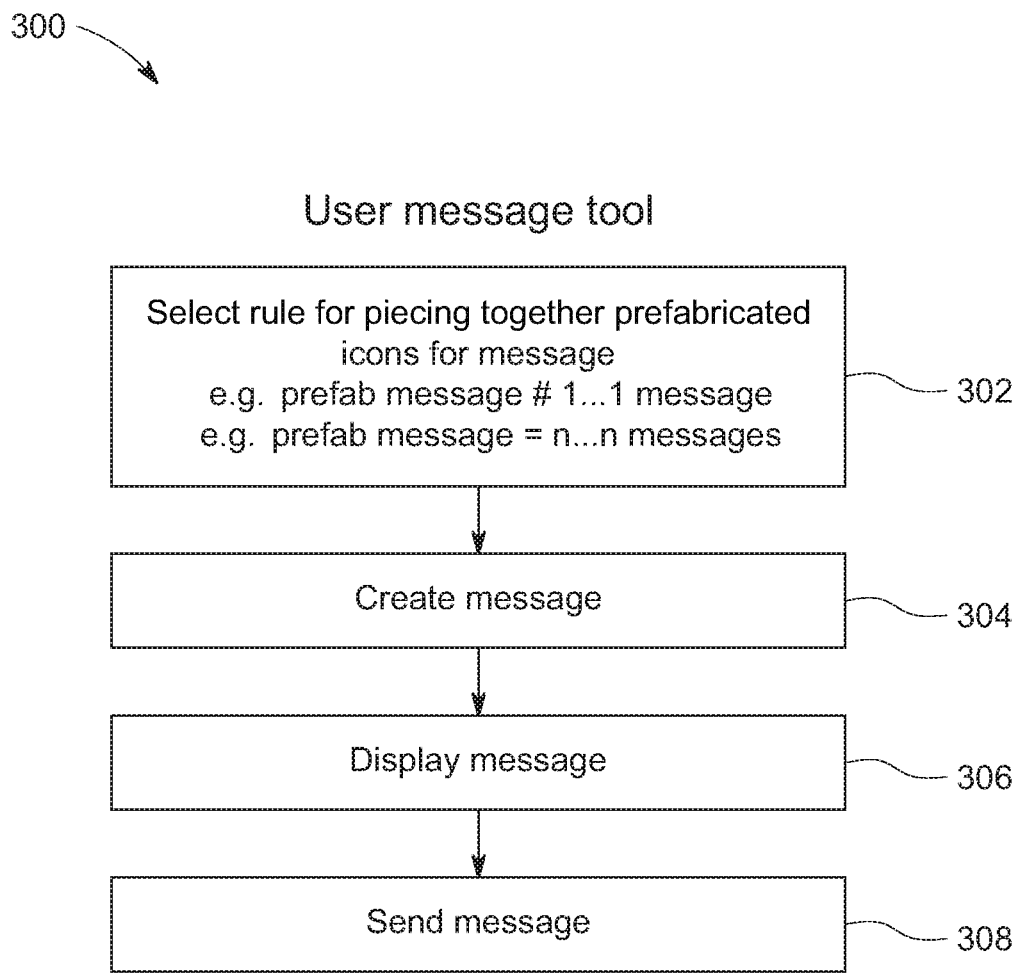
FIG. 3 illustrates a flow chart of a user operation to create a message according to an embodiment.

With reference to FIG. 3, a user tool 300 is now shown that allows a user to assemble a message, through an app or a web portal, in accordance with the present disclosure. In an embodiment, there is a user message tool 300 that operates on a user computing device. The message tool allows a user to select one or more rules 302 for piecing together a message containing at least one prefabricated icon. The message tool allows users to select parameters for the prefabricated icons stored in the message library. The search tool may provide for searches based on frequently used icons, icons related to a particular sport (like baseball, field hockey, figure skating, etc.), sporting events (i.e. World Series, Super Bowl, Stanley cup, World Cup, etc.). The search tool may also allow searches for particular holidays (Kwanza, Christmas, Ramadan, etc.), as well as days of observation (Mother's Day, Father's Day, International Children's Day, etc.). For any of these categories and many more, one or more prefabricated icons may reside on the message library. Users may select these icons for use in a message as described herein.

Once the user has selected the icon(s) for the message s/he wants to send, the user may display a message 306. The message display occurs by the user selecting a template for the presentation of the icon(s) and assembling a message by choosing which icons go into the template. Once the icons are chosen for the template, the message is displayed 306 to the user. If the user approves of the presentation of the message, the user may send the message 308 to another user or group of users.

Figure 4:
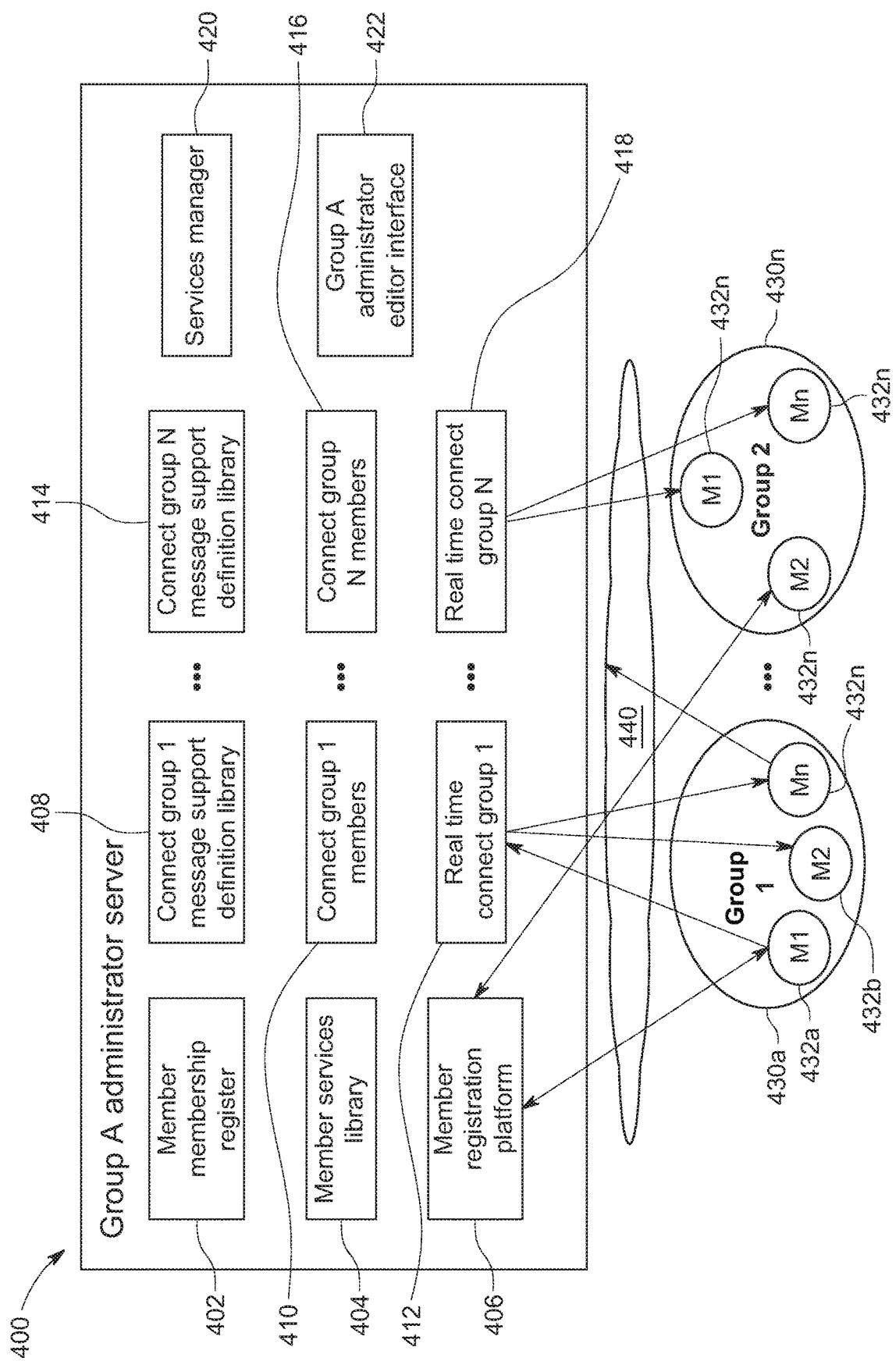
FIG. 4 illustrates a group administrator server according to an embodiment.
Figure 5:
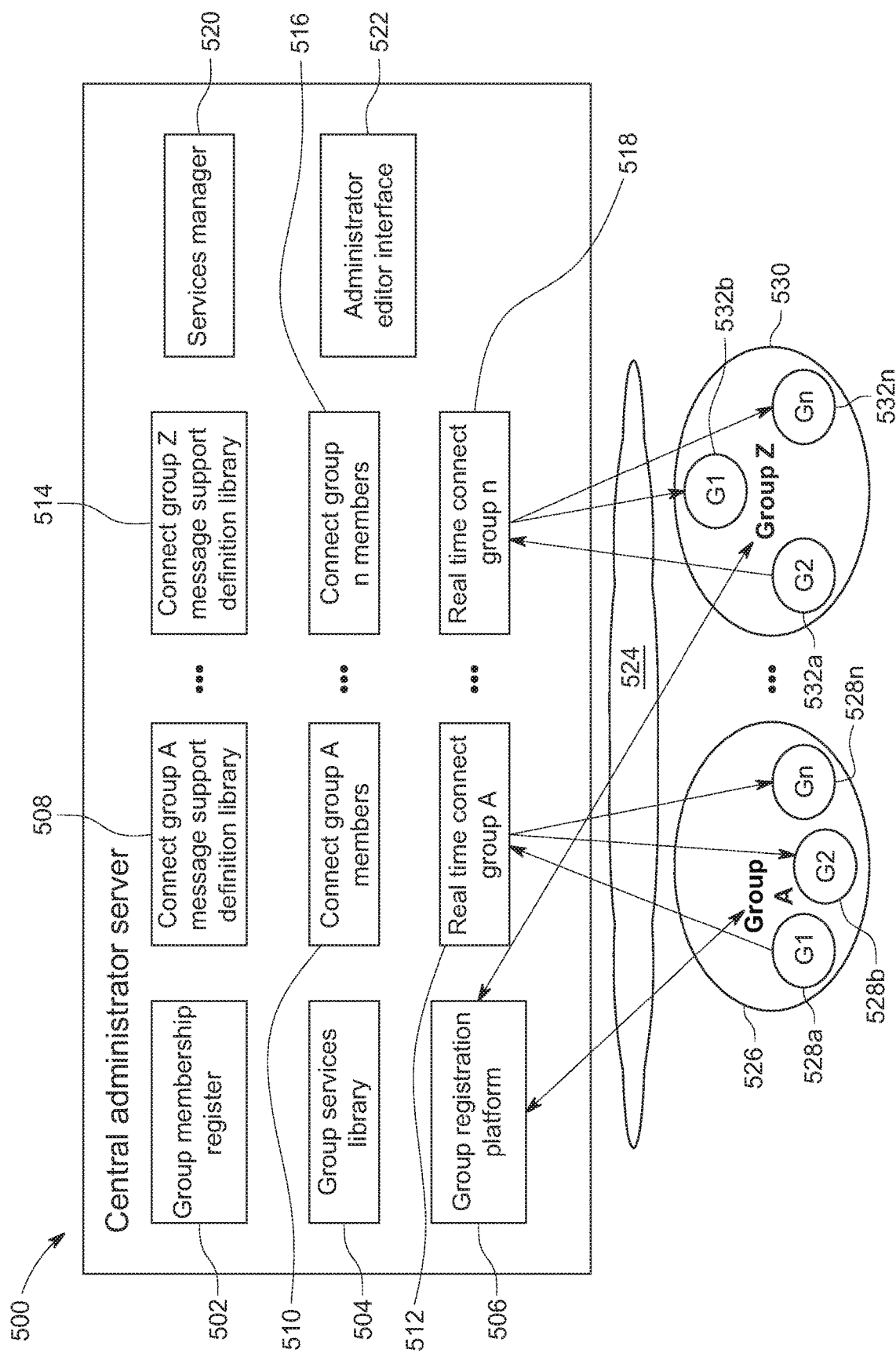
FIG. 5 illustrates a central administrator server according to an embodiment.

In various embodiments, there is a computer-implemented system for communicating a message over a network using a secure messaging protocol between two computing devices in a group. As shown in FIG. 4, the system utilizes a first group administrator server 400 comprising a membership register 402, a member service library 404, a member registration platform 406, a service manager 420, at least one message library 408, 414, and a first group administrator editor interface 422.

As depicted in FIG. 4, Group 1 includes members M1 432a, M2 432b through Mn 432n. Each of members M1 432$_a$, M2 432$_b$ through Mn 432$_n$ registered to be a member of Group 1 through member registration platform 406 and the registration information of each of members M1 432$_a$, M2 432$_b$ are stored in a connect Group 1 members register 410. Members M1 432$_a$, M2 432$_b$ through Mn 432$_n$ communicate with each other through real time connect group 1 412 in the Group A Administrator server. The messages that Group 1 members may use to communicate with each other are defined by the contents of the Connect Group 1 Message Support Definition Library 408.

Similarly, Group N includes members M1 432$_a$, M2 432$_b$ through Mn 432$_n$. Each of Group N members M1 432$_a$, M2 432$_b$ through Mn 432$_n$ registered to be a member of Group N through member registration platform 406 and the registration information of each of members Group N members M1 432$_a$, M2 432$_b$ through Mn 432$_n$ are stored in a connect Group N members register 416. Members M1 432$_a$, M2 432$_b$ through Mn 432$_n$ communicate with each other through real time connect group 1 412 in the Group A Administrator server. Members M1 432$_a$, M2 432$_b$ through Mn 432$_n$ communicate with each other through real time connect group N in the Group A Administrator server. The messages that Group N members may use to communicate with each other are defined by the contents of the Connect Group N Message Support Definition Library 414.

The message library 408, 414 contains one or more digital prefabricated icons. The prefabricated icons provide the only message content allowed by the message system of this disclosure. Thus in various embodiments, there is a storing of one or more of a prefabricated icon in a message library of an electronic message system. Each prefabricated icon provides at least one of a celebratory, positive or festive message. Advantageously, the prefabricated icons are created for the administrator and may not be altered by the user. A prefabricated icon may include alpha numeric symbols (individual numbers and letters) but the alpha numeric symbols (individual numbers and letters) included in a prefabricated icon may not be modified by a user. The user may only freely assemble the prefabricated icons that are in the message support library to send messages. For instance, a user may not type the letters H-E-L-L-O. Rather, by this disclosure, the user may only locate and use one of the prefabricated icons bearing the letters H-E-L-L-O to convey that communication. As another example, a user may not type C-O-N-G-R-A-T-U-L-A-T-I-O-N-S. Rather, by this disclosure, the user may only locate a prefabricated icon with these words to convey that communication. Additionally, only prefabricated icons may be inserted into messages as explained below. A user may not type any text characters to form words, acronyms or composite structures to simulate actual words (e.g. "H3ll"). Nor may a user use text characters to form emoticons.

It is seen from the above description that the first administrator server provides service to at least a first group of users 430$_a$, having individual members 432$_{a-n}$. The first group administrator server provides services of connecting the first group to a first message support definition library 408, connecting the members of the first group 410 and providing real time connect for the first group 412.

In an embodiment, individual users 432 may register with the member registration platform 406. A user may provide such information as the system may require to register, however the registration only needs sufficient information so as to identify the user, so a user may log in to the app to send and receive messages. The system may require other information, however for the basic operation of the messaging system, no personal data is required. Once a user registers with the membership registration platform 406, the user membership data is recorded in the member membership register 402. With the user identified to the system, the system may download the appropriate programs (apps) to run on the user's computing device. The programs come from the member services library 404, and may be adapted to fit to the particular operating system of the user device, as well as other parameters to provide the best performance of the user.

In some embodiments, the member registration platform 406 acts as an open gate, but not as a gate keeper. The member registration platform takes user information, such as a log in ID and password, but otherwise does not restrict any user to access the system. Individual users may send messages within the system by only using the prefabricated positive message icons. Thus, in some embodiments, a gate keeper function is not needed to prevent bullying or undesirable content since such undesirable content may not be generated within the system.

Once the user is registered and has access to the appropriate software, the user may engage in messaging other members of the messaging service. In an embodiment, a user 432$_a$ of Group 1 may have presented to his member computing device at least one prefabricated icon configured for placement into a message for communication over the electronic messaging system. The user 432$_a$ may connect to a first group 408 and generate messages using that message support library. When the user has assembled a message, s/he may send it to other members of the group 410 via the real time connect to the group 412. In an alternative embodiment, the connect may not be in real time, but have some amount of delay before either transmission or receipt of each message. Rules for connections may be found in the member services library 404.

The transmission and receipt of messages, and the communication between the user device of user 432$_a$ and the group a administrator server may be through the cloud/web 440. The number of users that may access the administrator server is only limited by the capacity of the server and the bandwidth of the communication through the cloud/web 440. Other members 432$_n$ may join a first user 432$_a$ to form a group of users 430$_a$. As the service gains more users, and the users form different groups of interests or topics, the number of users $432_n$ and groups $430_n$ expands. In some embodiments, the message support definition library $408_{a-n}$ of each group may be the same, or different from the other message support definition libraries. Each group may have a specialized message support definition library associated with their particular group. In still other embodiments there may be a large percentage of common icons in the various message support definition libraries with only small variations. In yet other embodiments, the libraries may all be the same. In some embodiments there may be a single main library, where each message support definition library has a limited access to the material of the main library.

In an embodiment, there is a services manager 420 that oversees the icon message library. The services manager may add, remove but cannot modify the content of any pre-fabricated icons in any message library. Changes to the library may only involve the addition or removal of any prefabricated icon stored in the library, or a change in the association of an icon to any tag, search term or other parameter which the icon may possess. In some embodiments a service manager may be a software or operation tool that has rules and parameters defined for the server operation.

In some embodiments, the administrator editor interface 422 may be an administrator interface as previously described. The administrator interface may be for a person with administrator access to interact with the administrator server 400. The administrator may have access to the member services library 404 to make changes in the various programs stored there. Updates and changes to software programs are required to keep pace with changes associated with user platforms. In some embodiments the administrator may make changes to the membership register, by adding, deleting or altering group associations of different users. In other embodiments the administrator may have access to and change one or more of the message support definition libraries.

In an embodiment, there is a computer-implemented method for communicating a message over a network using a secure messaging protocol between two computing devices in the network. The method comprises storing one or more of a prefabricated icon in a message support library on an electronic messaging system. Each prefabricated icon providing at least one of a celebratory, positive or festive image. The method also presenting to a member computing device at least one prefabricated icon configured for placement into the message for communication over the electronic messaging system. The method also comprising selecting at the member computing device of one or more prefabricated messages for insertion into a message field of the message, the message field being associated with a header field to complete an electronic message. The method also receiving at a network computing device of the electronic message system the message selected at and transmitted by the member computing device. The method broadcasting a transmitted message to the member computing devices subscribing to membership in a communication group service associated with the member computing device sending the message. The message sent by the method doe not contain content other than the one or more prefabricated icons.

The group A administrator server may provide the services described to additional groups $420_{b-n}$ as desired. Each group may have a corresponding connect group N message support definition library $408_n$, a connection for the N group members, and a real time connect for group N members.

Figure 6:
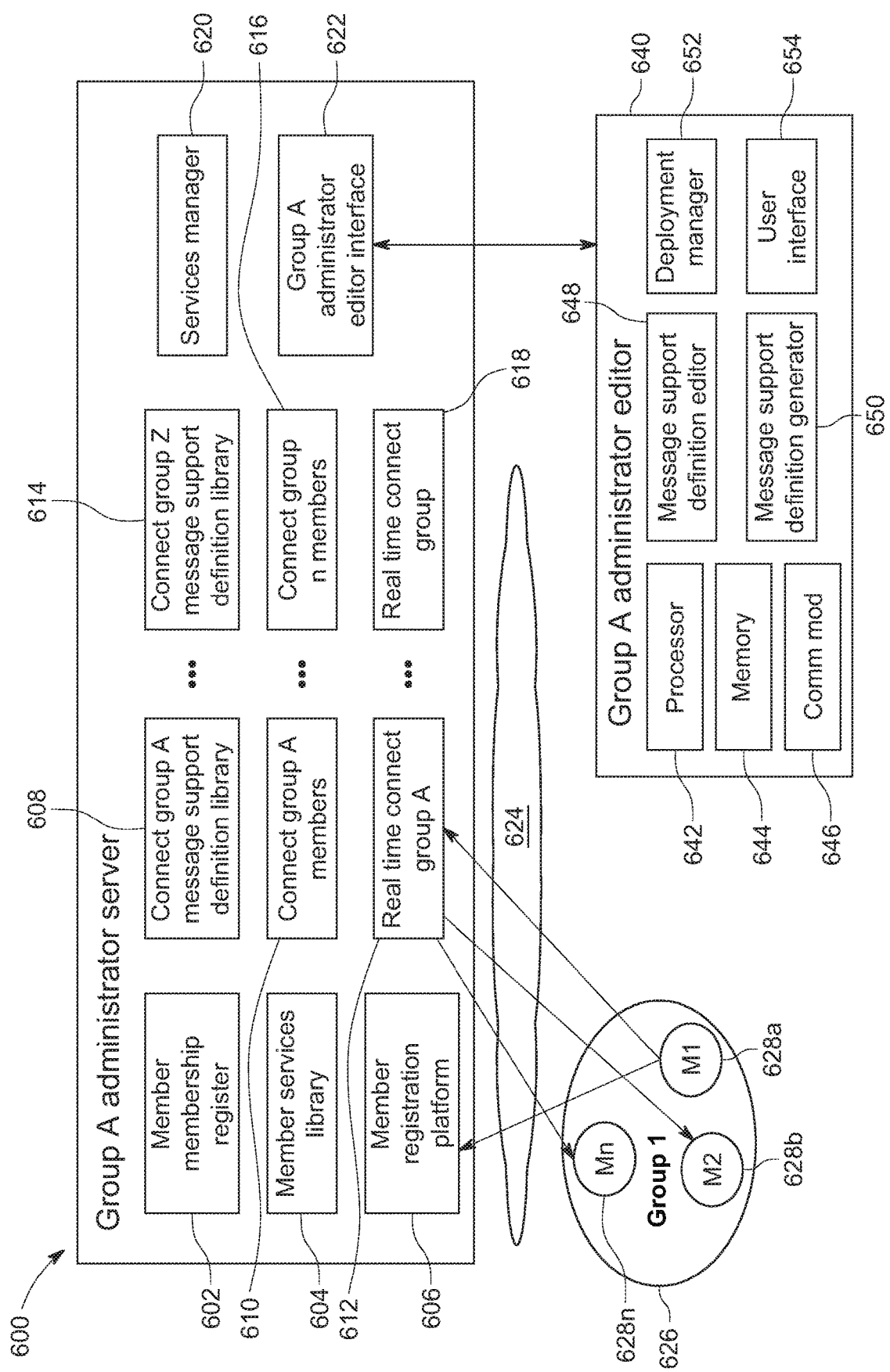
FIG. 6 illustrates an administrator editor and server according to an embodiment.

In other embodiments, there may be a central administrator server 500 for use with groups using the messaging system instead of individual users (FIG. 6). Operationally, the structure for managing groups is similar to the structure used for creating the messaging system for individuals. Individual groups G1, G2, Gn (528a, 528b, 528n) may combine to form a sort of "super group A" 526. The supergroup 526 may register using the group registration platform 506. The registration may pass through the cloud/web 524. Once the super group 526 is registered, their data goes to the group membership registration 502. The group may receive application data to their individual user devices from the group services library 504. When the super group 526 is connected to the system and has the system applications installed, the super group may engage in sending messages using the system of the present disclosure.

In some embodiments, the super group 526 has member groups $528_{a-n}$, that may communicate in real time with the connect operation of the central administrator server 512. Through this portal, the supergroup 526 members may communicate with each other, or other subgroups, or other supergroups $530_{a-n}$ by creating messages from the message support definition library $508_{a-n}$, and through the connections to members $510_{a-n}$. The group server also has a services manager 520 to manage the message support definition library, and an administrator editor interface 522.

FIG. 4 depicts one embodiment of this disclosure where members $432_a$, M2 $432_b$ through Mn $432_n$ in Group $G_1$ communicate with each other through real time connect group 1 412 in the Group A Administrator server and the messages that Group 1 members may use to communicate with each other are defined by the contents of the Connect Group 1 Message Support Definition Library 408.

Figure 7:
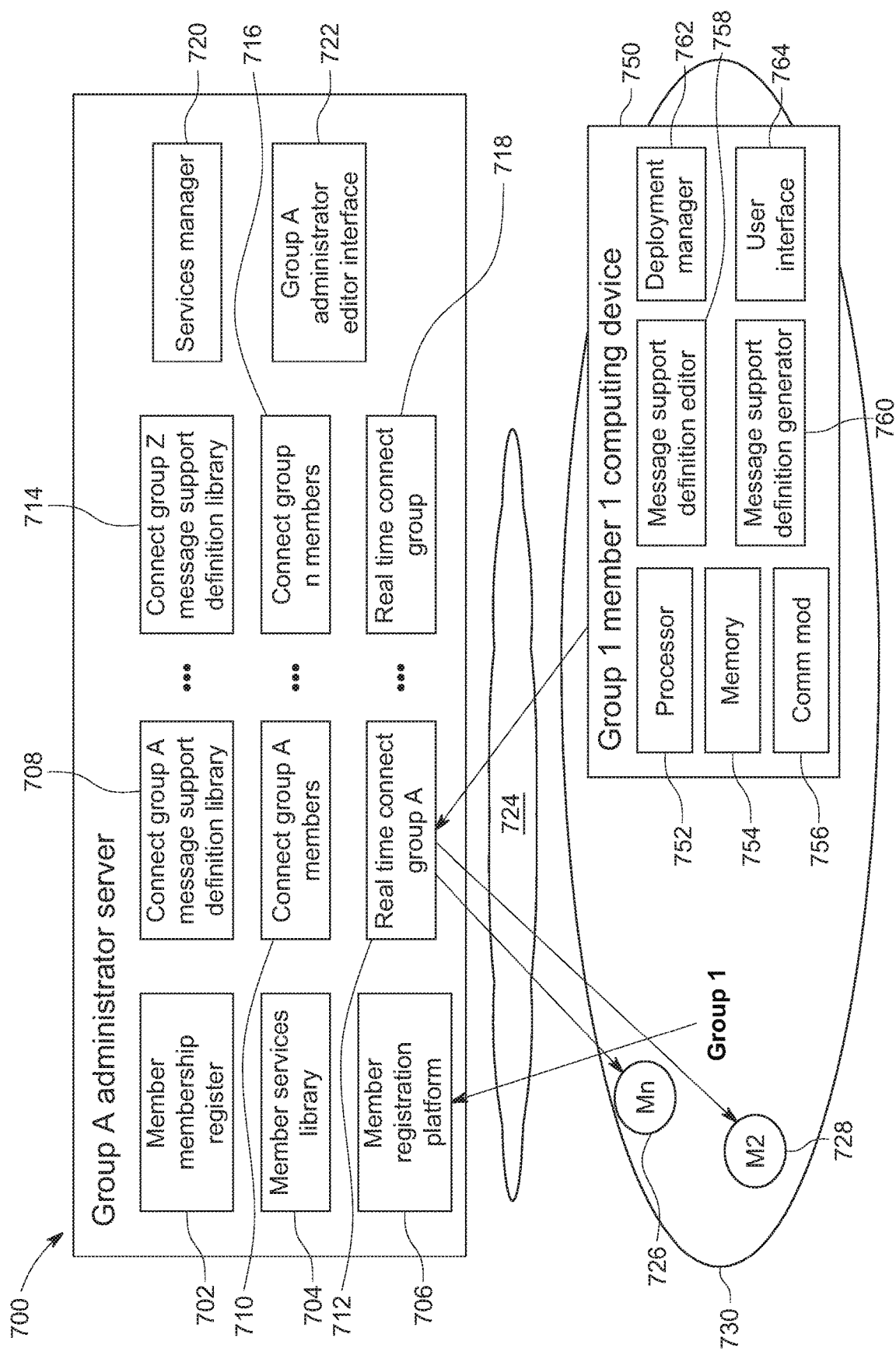
FIG. 7 illustrates a member computing device interaction with an administrator server according to an embodiment.

In an embodiment, there is an example member computing device 750 for using the messaging system of the present disclosure as shown in FIG. 7. In an embodiment, the member computing device 750 comprises a processor 752, a memory device 754, a communication module 756 with a user interface 764 and a display (not shown). The member computing device has a message support definition editor 758 and a message support definition generator 760. The generator 760 may be used by the user to produce templates, or retrieve templates, of acceptable message formats. These formats include blanks or fields that may be populated by prefabricated icons from the message support definition library 708, or with icons already in the template itself. The message support definition editor 758 may be used to reposition or perhaps resize or reorient the various prefabricated icons from the library. The editor 758 and generator 760 are generally software tools, but may also be hardware components, or a mix of hardware and software. The member computing device 750 may also have a deployment manager 762 and be connected to the administrator server through the cloud/web 724. Each user computing device may have similar characteristics such that each user device functions in essentially the same manner with respect to the external administrator server 700.

Figure 8:
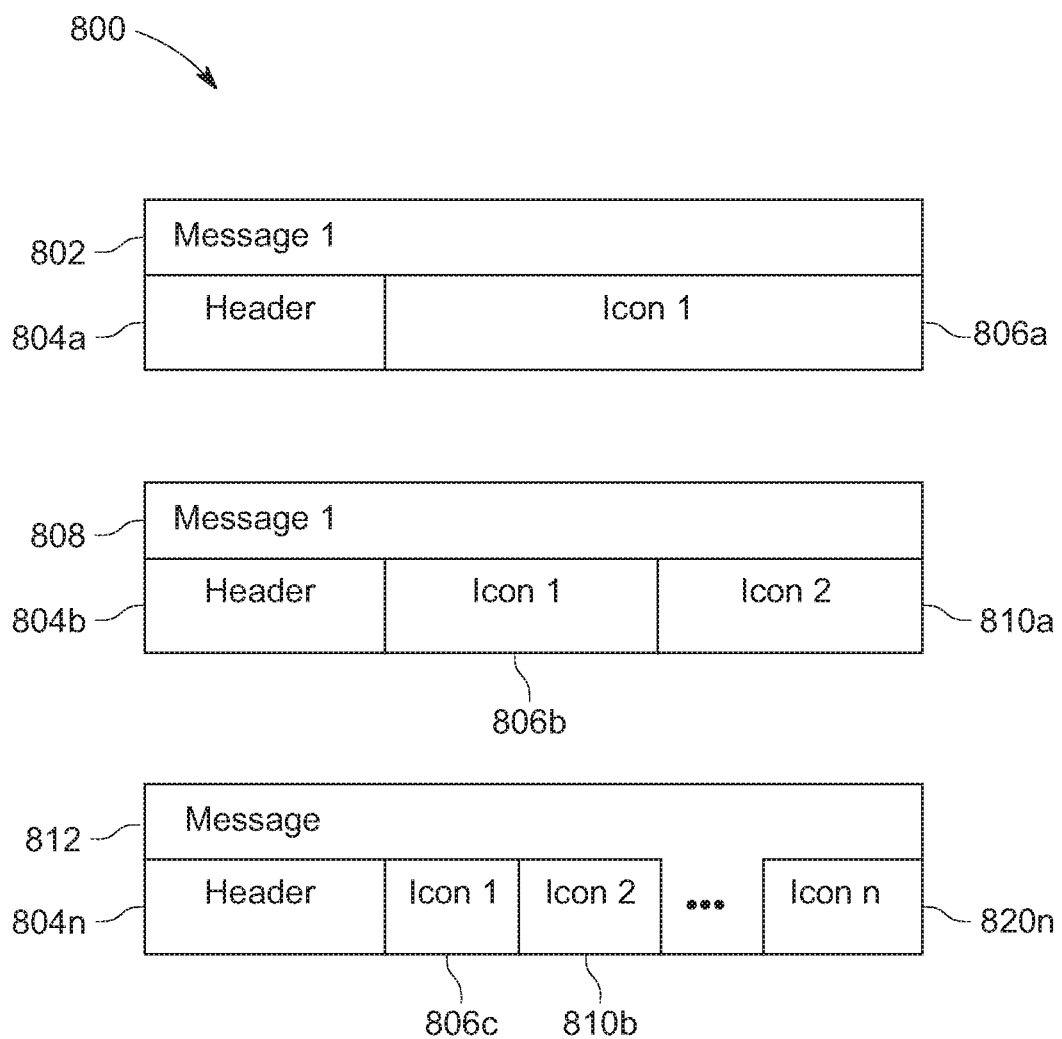
FIG. 8 illustrates samples of constructing messages according to the various embodiments.

Several non-limiting examples of a message templates 800 are now illustrated in FIG. 8. Each message for use with the present disclosure may have a header section 804, and a message section 806a. The message content field contains one or more prefabricated icons selected by the user for the message to be sent.

In an embodiment there may be a message 802 for the display of a single icon $806_a$. The message header field $804_a$ may provide the necessary information to address the message to the proper recipient. The message header field $804_a$ may include data regarding a user group, a super group or an individual, all of whom are identifiable by the system. The message content field in message 802 contains only one prefabricated icon selected by the user for the message to be sent.

In another embodiment, a message 808 may have a message header field $804_b$, containing similar information regarding the recipients. The message 808 contains two message content $806_b$ and $810_a$ for inclusion of two prefabricated icons selected by the user for the message to be sent.

In another embodiment, there is a message 812 again having a single header field $804_n$ of the message, along with multiple message content fields for the containing multiple prefabricated icons $806_c$, $810_b$ ... $820_n$ selected by the user for the message to be sent.

It should be appreciated that the arrangement of the icons may be in any fashion. Templates for use with the messaging system may arrange the prefabricated icons selected by the user according to the content layout provided by the template. The template may be displayed for the user to visualize how the prefabricated icons selected for the message to be sent will look to the recipient of the message. For example, a template may be configured to display one or more prefabricated icons in a symmetrical way on a display screen. For example, the template may show a single prefabricated icon in the center of the displayed message, two prefabricated icons spaced apart and side by side, three prefabricated icons at three corners of an imaginary triangle, four prefabricated icons at the four corners of an imaginary square, and so on. In other embodiments the icons may be arranged according to the configuration of the template in a linear fashion, either a row of icons up and down, or side to side. In some embodiments the row of icons may be in a diagonal, horizontal or vertical line. In some embodiments the icons may be arranged in a circular fashion, a geometric pattern or a random patter within the display field.

The header information of the messages may be displayed in plain uneditable text (such as "Group A—Baseball fans") as represented to the system in a user account, group user account or user address (such as an IP address). According to this disclosure, a user may not edit the header field of a message while creating a message since that is part of the user configuration in the group(s) in which the user is a member. The user may also not alter any of the prefabricated icons that a user may insert into a message. The messaging permitted a user by this disclosure is limited to the selection and presentation of prefabricated icons designed by or for the administrator on user selected templates designed by or for the administration.

This disclosure thus provides an electronic messaging system that may accept users and allow messaging without cyber bullying since only the messaging language of the administrator is permitted for messaging. That language is the language embodied in the prefabricated messages, templates, rules, and other features designed for the administrator. The communication language of this disclosure employing prefabricated positive messages serve as filters. Since these messages are positive messages only positive messaging communication is permitted by this disclosure. The messaging service of this disclosure may be used to foster positive feedback for its members. The positive messages based on prefabricated icons serve as filters on negative messaging and cyber bullying since the only communications permitted are the prefabricated positive messages of this disclosure. This disclosure does away with the reliance on detailed and invasive filters that are conventionally used to attempt to weed out people who may have negative intent in their communications.

Figure 9:
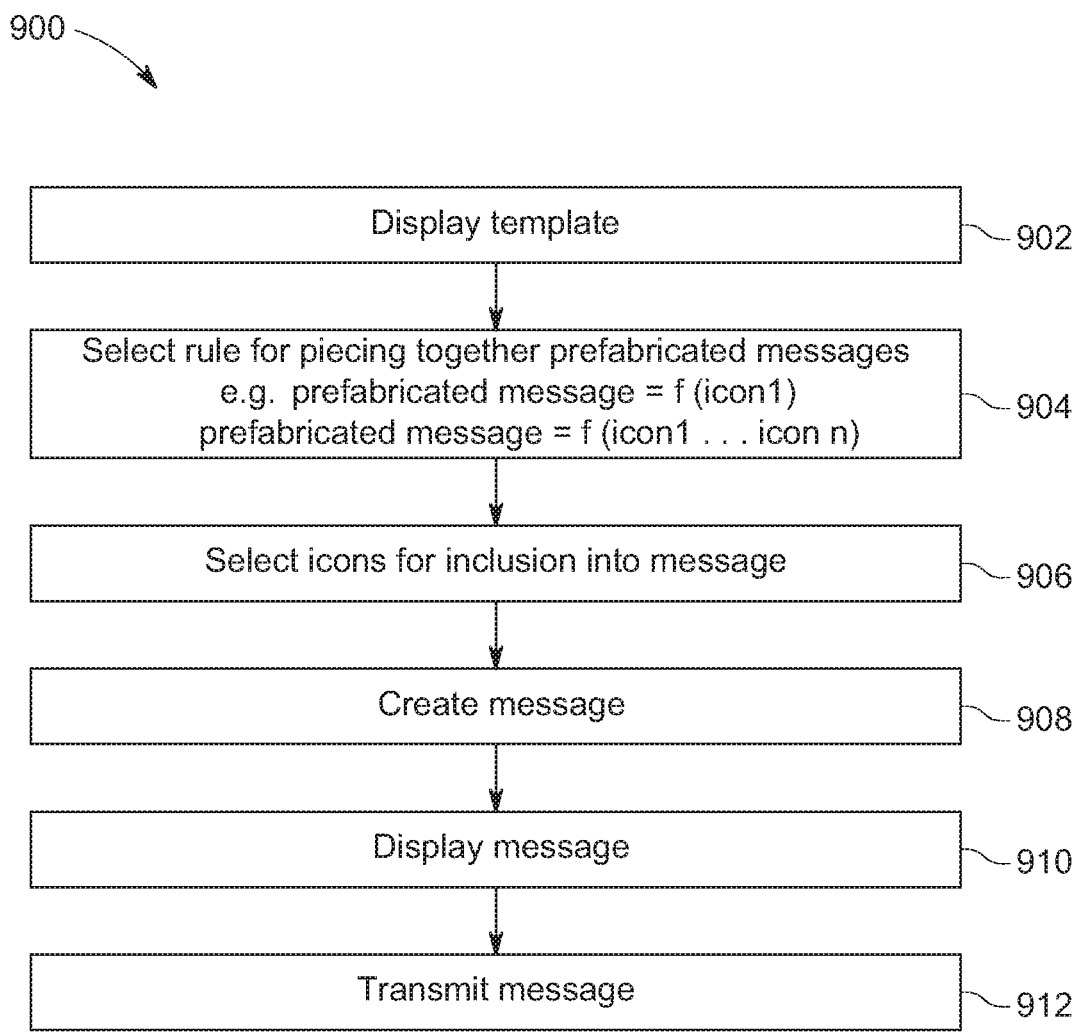
FIG. 9 illustrates a method for generating a user display template.

The assembling of a message may follow a template 900, such as illustrated in FIG. 9. In a non-limiting example, a display template 902 may be called up by a user on the users display. The user may navigate through a variety of templates having different visual appearances, but providing fields for the placement of prefabricated icons from the system. A user may select any available template, and then follow a straight forward procedure of populating the open fields of the template with icons from the system libraries. The user selects 906 as many icons as desired for the message, and then manually inserts them into the available message fields of the selected template. In an alternative embodiment, once the user has identified the icons s/he wants to use, the system may auto-populate the template with the selected icons. Once the fields are populated with icons, the user may opt to assemble the message 908, at which point the system will lock in the users preferences for the message and display the message 910 for the user to see. The user may then opt to transmit the message 912 to the desired recipients.

Figure 10:
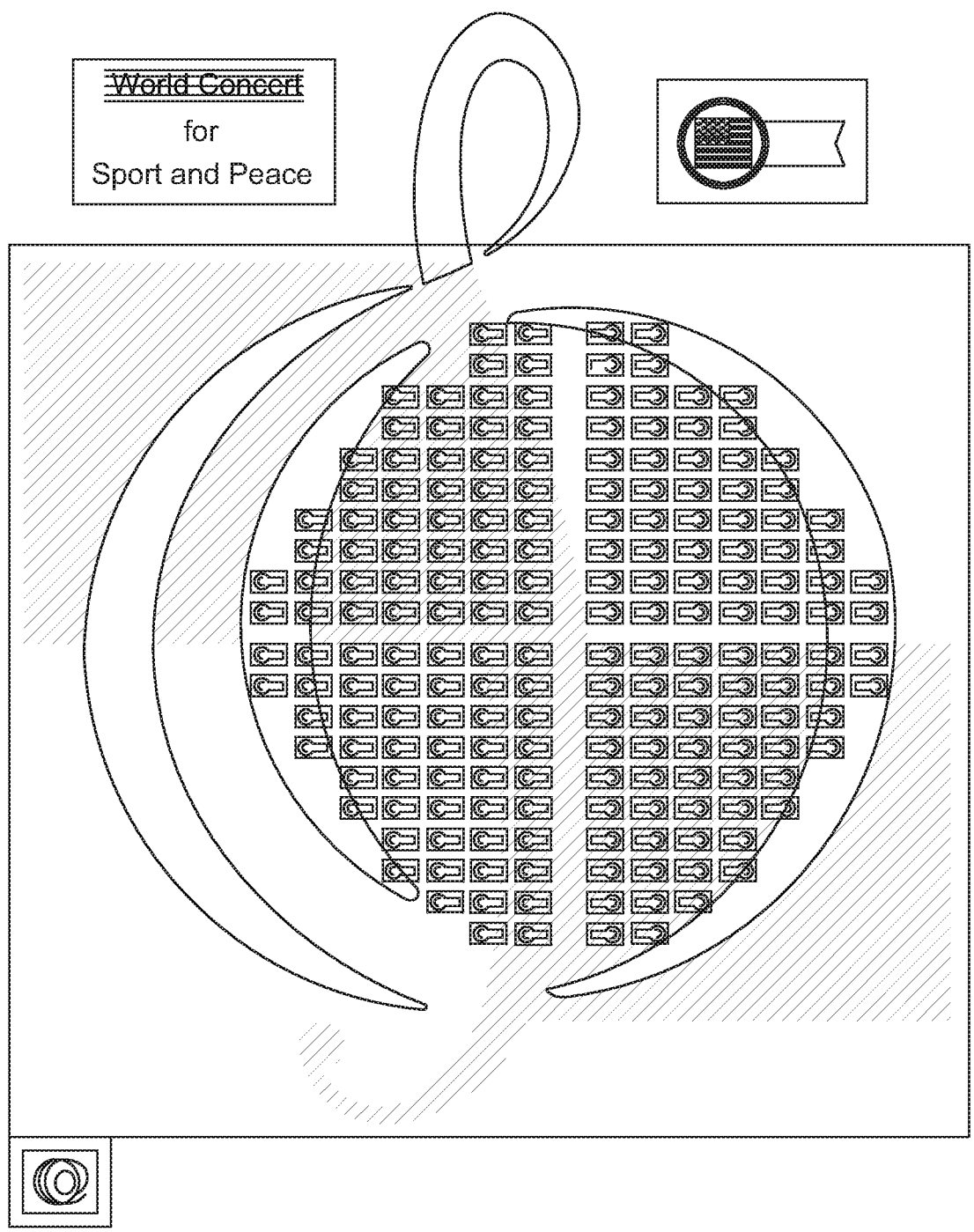
FIG. 10 illustrates a template for a prefabricated icon.

An example template for use with the system of this disclosure in assembling messages is shown in FIG. 10. The sample template provides four prefabricated icon fields. In some embodiments, all the fields may be populated by a user. In other embodiments, one or more of the fields may be populated while other fields may be predetermined by the template.

In an embodiment where the fields are active, in the FIG. 10 example, a single large field appears in the center, with two smaller fields in the upper corners, and a single smaller field in the lower left. In one aspect, the size of the windows may all be defined by the selected template. In another aspect, the template may allow the fields to be enlarged or reduced in window size depending on how the user wants to present the message and what prefabricated icon the user may seek to dominate the message field. For example, a larger window may be used to convey the primary message, while smaller sized fields may be used to show icons representing messages the user wishes to convey at a lesser or secondary level.

In the non-limiting illustrated example, the principal field shows all the members of the user's messaging group presented in a musical clef note design. In this example, the prefabricated icon chosen by the sender of this message chose a clef note. However, the sender may choose other shapes in which to display the users of the messaging group.

A user may select a prefabricated icon that contains word icons, however a user may not change the words or any other aspect of the prefabricated icon using his or her alphanumeric Each field may only contain a prefabricated icon. The prefabricated icon may be created for the administrator to contain alpha-numeric characters pre-arranged into a positive, celebratory or cheerful message. But no user may ever edit the prefabricated messages icons or create their own message from alpha-numeric symbols.

Figure 11:
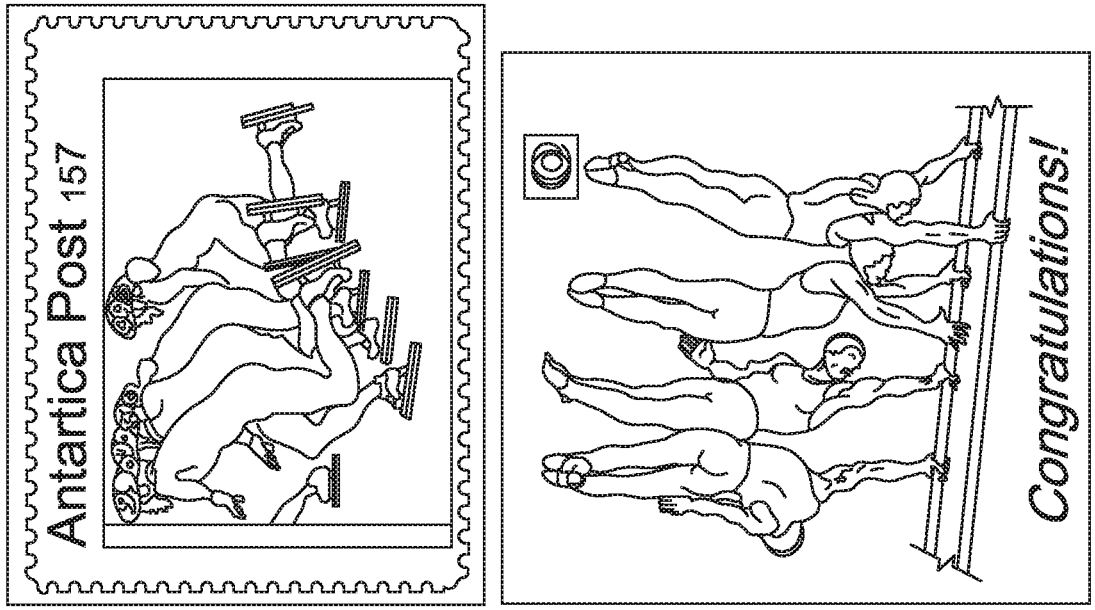
FIG. 11 illustrates several examples of prefabricated icons.
Figure 11:

Examples of prefabricated icons are now presented in FIG. 11. The prefabricated icons may be stylized in an artistic fashion, and may show art identifying a particular sport, event, hobby or other common interest among two or more users. Each icon may have a stylistic feature such as (decorated fonts, multicolor displays, multi-language text, alphabets and signage, festive symbols, like flags, stars, ribbons, insignias, and so on), stylistic festive features not available from a keyboard, combined with words and phrases to convey a particular idea. Some ideas may be "good luck!", "happy birthday!", "happy holidays" and so on.

The prefabricated icons envisioned for use with the message system described herein are more complex than emojis and emoticons in that the prefabricated icons have individualized artistic elements. The icons may include words and symbols as part of the icons, but do not use alpha numeric symbols that allow individual users to generate natural language texts or even emoticons.

In some embodiments, where the prefabricated icon comprises an image with a word or words, the word may convey a positive, festive or congratulatory message as well as the art of the icon, which similarly conveys a positive, festive or congratulatory message on its own. These individual icons, or icons with text may provide an image of an event with a word that spells out the event, such as "victory" over an icon of a gold medal, or "diploma" over an icon of a graduation cap, and so on. In some embodiments, a user may be able to mix a prefabricated icon of a picture, with a prefabricated word icon and form an overlay of the two icons. In all cases, these prefabricated icons are created for the administrator. A user may never alter the content of a prefabricated icon according to this disclosure.

Within each inner circle, most of these people are directly and intimately connected periodically by sport victories and failures of their loved ones, as well as by personal events like birthdays, anniversaries, exams, new jobs and promotions, family events, the New Year and other events and celebrations. There are other tens of millions of enthusiastic sports fans in the World who—although may not have an athlete in the family—also have inner circles of family members and best friends.

Potential members of the Billion Club are the hundreds of millions of young athletes and other sport enthusiasts throughout the world, as well as their families and close friends. The social glue that sustains the Billion Club at base level is the frequent online interaction between the members of each independent inner group (intra-group communication). Thus, the overall foundation of the Billion Club structure consists of: (1) at micro level, the internal communication between the closely connected members of each inner circle, and (2) at macro level, the myriad of lines of communication between the Club, as a central point, and each and all of its members throughout the world.

The intra-group communication at base level can be facilitated by an array of prefabricated standard or customizable communication tools, programs and platforms.

CheerEmail is an abbreviated email platform that uses a limited cheering vocabulary expressed in a diversified and colorful way of presentation (fonts), It operates with short popular expressions frequently used by closely connected sport fans. Among these "congratulations", "cheering for you", "victory", "let's celebrate", "let's party", "you are the best" etc. Frequently, some of these expressions are also used outside of the world of sports. CheerEmail could operate in all languages of the world.

Brevis Mail is a scaled version that employs both the cheering expressions used by CheerEmail as well as some of the most popular greetings: "Happy Birthday", "Happy New Year", "Happy Anniversary", "Happy Valentine", "Happy Mother's"/"Father's Day" etc. Prospectively, Brevis Mail could employ thousands of short, abbreviated expressions. Similar to CheerEmail, by operating with hundreds of fonts in all languages of the world. Brevis Mail is capable of generating several millions of messages. It could operate with pre-printed standardized expressions.

Stampiade: Essentially, Stampiade is a further scaled version of Brevis Mail, in the sense that each greeting expressed in hundreds of fonts and languages in Brevis Mail is now encapsulated into a stamp format sport illustration, image. Stampiade brings variety and specificity to the intra-group communications, as it could be selective, addressing specific, preferred sports, and, practically, could generate unlimited variations of images, text, fonts, languages (billions of combinations).

BlanxGreets represent a variation of the Stampiade. It operates with a collection of stamp or other format blank sport illustrations, to be colored online or after being printed. BlanxGreets could include a pre-printed text (greeting, a.s.o.) or contain solely the illustration. BlanxGreets could display millions of illustrations in all sports.

LastScore represents a variation of "cheerEmail", "brevisMail", "Stampiade" and "SportBlanx" where the text refers to, or is replaced by the result, score of a recent sport competition.

Derivatives: all sport images included in Stampiade and BlanxGreets could be incorporated in diplomas, certificates of excellence, invitations, greeting cards, signature cards, specialized stamps and stickers, posters, memorabilia, or "thank you priceless checks", etc.

Another intra-group communication tool is flippyMail that operates, by clicking, with both sides of a message: images on one side (illustrations, photos, settles) and text, greetings on the other side. FlippyMail may require a password to flip the mail.

Signature: illustrations used in Billion Club's communication tools could be employed to create personal signatures by members. Similar to Stampiade where illustrations also incorporate text, in signatures the short text is the member's chosen conversation name. Stand-alone sport illustrations (without names) could also be used for signatures.

Single sport programs: The most popular sports in the world could have their exclusive platform of intra-group communication. E.g.: SoccerSpree, Football Spree, Hockey Spree etc. Some single sport programs could be region or country specific (e.g.: hockey).

EXAMPLE I

In an embodiment, there may be a messaging system dedicated to sports fans. The messaging system may accept users from anywhere in the world, and coordinate them based on their interests, or particular requests (e.g. fans of young John Doe1234 baseball club). Users in the group may exchange electronic messages showing support to young John Doe 1234 by sending prefabricated icons, such as those illustrated herein. The prefabricated icons represent a limited "vocabulary" of cheers, expressions or encouraging words. Some non-limiting examples may be icons that represent "congratulations," "cheering for you", "Victory", and "Good job!" These prefabricated icons represent a cheering function and may be used to encourage an athlete on.

In this example, the restrictive nature of the communication using only positively messaged, prefabricated icons according to this disclosure, lends itself to a communication platform that may not be used for bullying. An individual who seeks to send negative messages would be frustrated because due to the content of the library made available for messaging, only positive messages designed for the administrator may be communicated.

EXAMPLE II

In another embodiment, there may be a messaging system dedicated to particular celebratory days, such as birthdays, father's/mother's day, Christmas, Ramadan, Hanukkah, International Children's Day, etc. These messages would use a different set of prefabricated icons for users to message one another to express good wishes for the particular holiday or event. A user would select one or more prefabricated icon to send to another user to represent the good wishes or good intent desired, without using any texting capability.

EXAMPLE III

Content of the Message(s)

In another embodiment representing a messaging system dedicated to sport fans, or to particular celebratory days, the library of prefabricated icons may include prefabricated icons that consist of cheers or other positive word icons, and one or more black and white or colored images, where images may relate to specific sports and events, or groups of (summer) sports and (winter) events, or may represent a generic celebratory or otherwise positive pattern or arrangement (flowers, stars, flags, musical notes, symbols, etc).

In another embodiment where the prefabricated icon consists of cheers and images, the word icons are a specific word, like "victory" or "congratulations" which is appropriate in messages relating to a plurality of victory scenarios (in hundreds of summer and winter sport disciplines and events for women and men). In this embodiment the word "victory" or "congratulations" may be associated with a plurality of images to cover victory scenarios in all sport disciplines and events for women and men.

In another embodiment where the prefabricated icon consists of cheers and images, it may be the image that is unique or special, like the image of a gold medal or of a national flag, where the unique or special image is appropriate in messages relating to a plurality of victory scenarios. In this embodiment the unique or special image could be associated with a plurality of appropriate cheers and other celebratory words to cover victory scenarios in all sport disciplines and events for women and men.

In yet another embodiment where the prefabricated icon consists of cheers or other words and images, one particular image (like flowers, stars, national flag) may not be separate from the word element but, rather, imprinted on, or wrapped around the word(s) icon, with the particular image covering a portion of, or the entire word(s) of the message. In still another embodiment where the prefabricated icon comprises image with word icons, it is the word that may not be separate from the image but, rather, incorporated or imprinted onto the image, like "invitation" carved into the image either alone or accompanied by info re: event, place, time.

In another embodiment representing a messaging system dedicated to sport fans and to celebratory days is where the library of prefabricated icons may include prefabricated icons that consist solely of one or more images, where the image or images may relate to specific sports and events, or groups of sports and events, or may represent a generic celebratory or otherwise positive pattern or arrangement (flowers, stars, flags, musical notes, symbols, etc. and combinations thereof).

EXAMPLE IV

Libraries

Libraries have a vital function as messages can only be composed from prefabricated icons stored in electronic libraries. Prefabricated messages cannot be composed live from a computer keyboard or include input composed live from a computer keyboard.

Libraries may supply message material for thousands of messages that cover many expressions (i.e. cheers and celebratory) appropriate for tens of festive occasions, hundreds of male and female sports and sport events, tens or hundreds of languages and a variety of style and other personal preferences.

There may be one or more libraries of prefabricated icons. In some embodiments there may be one general library that hosts all of the prefabricated icons and their composing elements: types of prefabricated icons: word icons, image icons and image and word or composite icons. In another embodiment there is a plurality of libraries specialized for image icons, for word icons, for images with word icons and for combinations thereof.

In another embodiment, there may be libraries specialized on icon profiles, like libraries for each sport or event or for groups of sports and events (summer, winter, etc). In yet another embodiment, there may be separate libraries for female sports and for male sports, or libraries specialized on languages, or on defined colors or shapes of images, or on a plurality of other criteria.

EXAMPLE V

Composing a Message

Messages may be composed from prefabricated icons, or elements thereof, stored in one or more libraries. In one embodiment, a word icon message like "congratulations" or "happy birthday" could be simply picked up as such from the general library, or from the library of pre-composed word icons. In another embodiment, a message comprising an image icon and a word icon could either be selected from a general library that hosts the very selection of image and text, or be composed by picking up an image from the library of prefabricated images, and a word icon from the library of pre-composed word icons. In yet another embodiment, a complex message could be composed by picking up a plurality of prefabricated components from a plurality of libraries.

EXAMPLE VI

Templates

The complexities of a computer-implemented method and system for communication between athletes and sport fans around the world, through messages containing prefabricated word icons, or prefabricated images, or pre-composed word and image icons, all stored in electronic libraries, require a message assembling template. Such a message assembling template makes it possible to select and assemble, and to finalize for transmission the message comprising prefabricated icons, without any modification to the stored prefabricated icons or components thereof, and without any user generated text being included into the message.

Where the message comprises only prefabricated image icons, or only word icons, the template facilitates the selection of the prefabricated icon by securing access to the appropriate library and its content, and allowing the selection of the message through scrolling of the library or other means.

Where the user selects a message comprising image and word icons, the message assembling template makes it possible to assemble from a limited number of traditional cheers and other short expressions, a large variety of messages, each to be made available, in a plurality of choices, for each of the hundreds of sports and sport events for women and men in approximately two hundred languages.

In another embodiment, the member-computing device has access to two libraries, one of prefabricated images, the other of pre-printed greetings. The member also has access to a message assembling template that comprises two corresponding input windows or selection areas, one for prefabricated images, the other for preprinted greetings. The member scrolls the library of prefabricated images and selects the preferred image. The member also scrolls the library of prefabricated word icons and selects the word icon, or a matching word to the selected image, after which the member finalizes the preferred association, validates and transmits the message.

In another embodiment, the member computing device has access to more than two libraries of prefabricated images and word icons and to a message assembling template provided with more than two windows or selection areas, for composition of complex messages made of a plurality of prefabricated icons stored in their respective libraries.

The invention claimed is:

1. A messaging system for composing and communicating prefabricated icons using a secure messaging protocol, the messaging system comprising:
    memory storing instructions;
    one or more processors executing the instructions to cause the one or more processors to:
        provide access to the prefabricated icons, wherein the prefabricated icons are organized based on multiple criteria in dedicated galleries and libraries for the prefabricated icons, the prefabricated icons are configured to provide the sole message content to be sent to intended recipients by the messaging system;
        enable an administrator of the messaging system to generate the prefabricated icons for inclusion in the dedicated galleries and libraries;
        enable the administrator to update the dedicated galleries and libraries via an administrator interface;
        enable a user to access and to select one or more templates for assembling one or more messages to be sent to the intended recipients, wherein the prefabricated icons are selected for inclusion in the one or more messages to be sent to the intended recipients;
        the one or more templates containing a message field for inclusion of the prefabricated icons and a header field configured for device and user information for the intended recipients for transmittal of the one or more messages to the intended recipients;
        wherein, the content for the message field of the one or more messages assembled by the user solely includes the prefabricated icons, and is to be included in a plurality of configurable arrangements and displays within multiple message fields;
        each of the prefabricated icons included in the one or more messages is pre-composed in a fixed un-editable format and made available to the user on a ready-to-use basis, to be included in the one or more messages without content modifications,
    and
        wherein the one or more prefabricated icons to be included in the one or more messages comprise at least one of each: a prefabricated word icons including pre-composed, pre-printed cheers, greetings and other short expressions presented in one or more languages and alphabets; a prefabricated image icons including sport and celebratory images; a prefabricated mixed or composite icons including the prefabricated word icons and the prefabricated image icons within the prefabricated mixed of composite icons, and a prefabricated support icons comprising artistically stylized and celebratory elements.

2. The system of claim 1, wherein the message field configured for assembling the one or more messages includes only the prefabricated icons selected from the dedicated galleries and libraries of the prefabricated icons.

3. The system of claim 1, wherein the administrator of the messaging system in generating the prefabricated icons for inclusion in the dedicated galleries and libraries configures the prefabricated icons to be fixed format, un-editable and made available as-is to users for the selection and/or assembling of the messages.

4. The system of claim 1, wherein a particular form of the prefabricated mixed or composite icon made available by the system is an icon comprising one or more ceremonial, sport or other images: flowers, stars, flags, patterns, imprinted on, or wrapped partially or completely around one or more words, both image and word being integrated into the same one mixed or composed prefabricated icon.

5. The system of claim 1, wherein the prefabricated mixed or composite icon, may comprise one or more images presented in various formats and, is configured to contain an active field reserved for one or more prefabricated cheers or greetings and/or alphanumeric symbols selected from the dedicated system of galleries and libraries of prefabricated icons and configured to be inserted into the active field of the icon.

6. The system of claim 1, wherein the prefabricated mixed or composite icon, may comprise one or more words and/or alphanumeric symbols presented in a plurality of plain or stylized formats and, is configured to contain an active field reserved for one or more prefabricated image icons, selected from the dedicated system of galleries and libraries of prefabricated icons and configured to be inserted into the active field of the icon.

7. A process for composing and communicating prefabricated icons using a secure messaging protocol, the process comprising:
    providing access to the prefabricated icons, wherein the prefabricated icons are organized based on multiple criteria in dedicated galleries and libraries for the prefabricated icons, the prefabricated icons are configured to provide the sole message content to be sent to intended recipients by the messaging system;
    enabling an administrator of the messaging system to generate the prefabricated icons for inclusion in the dedicated galleries and libraries;
    enabling the administrator to update the dedicated galleries and libraries via an administrator interface;
    enabling a user to access and to select one or more templates for assembling one or more messages to be sent to the intended recipients, wherein the prefabricated icons are selected for inclusion in the one or more messages to be sent to the intended recipients;
    the one or more templates containing a message field for inclusion of the prefabricated icons and a header field configured for device and user information for the intended recipients for transmittal of the one or more messages to the intended recipients;

wherein, the content for the mess age field of the one or more mess ages assembled by the user solely includes the prefabricated icons, and is to be included in a plurality of configurable arrangements and displays within multiple message fields;

each of the prefabricated icons included in the one or more messages is pre-composed in a fixed un-editable format and made available to the user on a ready-to-use basis, to be included in the one or more messages without content modifications, and wherein the one or more prefabricated icons to be included in the one or more messages comprise at least one of each: a prefabricated word icons including pre-composed, pre-printed cheers, greetings and other short expressions presented in one or more languages and alphabets; a prefabricated image icons including sport and celebratory images; a prefabricated mixed or composite icons including the prefabricated word icons and the prefabricated image icons within the prefabricated mixed of composite icons, and a prefabricated support icons comprising artistically stylized and celebratory elements.

8. The process of claim 7, wherein the administrator of the messaging system in generating the prefabricated icons for inclusion in the dedicated galleries and libraries configures the prefabricated icons to be fixed format, un-editable and made available as-is to users for the selection and/or assembling of the messages.

9. The process of claim 7, wherein the message field configured for assembling the one or more messages includes only the prefabricated icons selected from the dedicated galleries and libraries of the prefabricated icons.

10. The process of claim 7, wherein a particular form of the prefabricated mixed or composite icon made available by the system is an icon comprising one or more ceremonial, sport or other images: flowers, stars, flags, patterns, imprinted on, or wrapped partially or completely around one or more words, both image and word being integrated into the same one mixed or composed prefabricated icon.

11. The process of claim 7, wherein the prefabricated mixed or composite icon, may comprise one or more images presented in various formats and, is configured to contain an active field reserved for one or more prefabricated cheers or greetings and/or alphanumeric symbols selected from the dedicated system of galleries and libraries of prefabricated icons and configured to be inserted into the active field of the icon.

12. The process of claim 7, wherein the prefabricated mixed or composite icon, may comprise one or more words and/or alphanumeric symbols presented in a plurality of plain or stylized formats and, is configured to contain an active field reserved for one or more prefabricated image icons, selected from the dedicated system of galleries and libraries of prefabricated icons and configured to be inserted into the active field of the icon.

* * * * *